United States Patent [19]

Croonenbrock et al.

[11] Patent Number: 5,212,941

[45] Date of Patent: May 25, 1993

[54] METHOD FOR OPERATING A COMBINED GAS TURBINE/STEAM TURBINE PROCESS

[75] Inventors: Raimund Croonenbrock, Engelskirchen; Hubert Steven, Gummersbach; Reinhold U. Pitt, Aachen, all of Fed. Rep. of Germany

[73] Assignee: L. & C. Steinmüller GmbH, Gummersbach, Fed. Rep. of Germany

[21] Appl. No.: 756,843

[22] PCT Filed: Mar. 6, 1990

[86] PCT No.: PCT/EP90/00367

§ 371 Date: Oct. 30, 1991

§ 102(e) Date: Oct. 30, 1991

[87] PCT Pub. No.: WO90/10785

PCT Pub. Date: Sep. 20, 1990

[30] Foreign Application Priority Data

Mar. 7, 1989 [DE] Fed. Rep. of Germany ....... 3907217

[51] Int. Cl.$^5$ .................................................. F02C 6/00
[52] U.S. Cl. ................................... 60/39.02; 60/39.12; 60/39.17; 60/39.182
[58] Field of Search ............... 60/39.02, 39.12, 39.17, 60/39.182, 39.464

[56] References Cited

U.S. PATENT DOCUMENTS

| | | | |
|---|---|---|---|
| 4,058,974 | 11/1977 | Pfenninger | 60/39.12 |
| 4,095,419 | 6/1978 | Pfenninger | 60/39.12 |
| 4,270,344 | 6/1981 | Yu . | |
| 4,352,300 | 3/1981 | Willyoung | 60/39.182 |
| 4,387,560 | 6/1983 | Hamilton et al. | 60/39.12 |
| 4,468,923 | 9/1984 | Jorzyk et al. | 60/39.182 |
| 4,866,928 | 9/1989 | Raiko | 60/39.12 |
| 4,896,498 | 1/1990 | Knizia | 60/39.12 |
| 4,901,521 | 2/1990 | Schemenau et al. | 60/39.12 |
| 5,111,662 | 5/1992 | Nicolin et al. | 60/39.182 |

FOREIGN PATENT DOCUMENTS

| | | |
|---|---|---|
| 0247984 | 12/1987 | European Pat. Off. . |
| 3224577 | 1/1984 | Fed. Rep. of Germany . |
| 3415768 | 10/1985 | Fed. Rep. of Germany . |
| 3536451 | 4/1987 | Fed. Rep. of Germany . |
| 3612888 | 10/1987 | Fed. Rep. of Germany . |
| 62-142828 | 6/1987 | Japan . |
| 8702755 | 5/1987 | World Int. Prop. O. . |

Primary Examiner—Richard A. Bertsch
Assistant Examiner—Howard R. Richman
Attorney, Agent, or Firm—Robert W. Becker & Associates

[57] ABSTRACT

In a method for operating a combination of a gas turbine process and a steam turbine process, in which the superimposed boosted gas turbine process is operated with compressed air and a combustible fluid, and the steam turbine process is operated via a fluidized bed furnace with a carbonaceous solid fuel, whereby the combustion in the fluidized bed furnace is performed with the oxygen-containing exhaust gases of the superimposed gas turbine process and electrical energy is generated with both processes, the efficiency is increased by expanding the exhaust gases of the superimposed gas turbine process only to an extent to which the fluidized bed furnace is operable as a pressurized fluidized bed and subjecting the exhaust gases of the pressurized fluidized bed furnace, after removing solid particles, to a second gas turbine process for further expansion and then to a heat exchange with the compressed air of the superimposed gas turbine process; the air for the superimposed gas turbine process is subjected to a two-stage compression with recooling, whereby the compressing energy for the first stage is derived from the second gas turbine process and the compressing energy for the second stage is derived from the superimposed gas turbine process.

12 Claims, 2 Drawing Sheets

METHOD FOR OPERATING A COMBINED GAS TURBINE/STEAM TURBINE PROCESS

BACKGROUND OF THE INVENTION

The present invention relates to a method for operating a combined gas turbine/steam turbine process in which the superimposed boosted gas turbine process is operated with compressed air and a combustible fluid, and the steam turbine process is operated via a fluidized bed furnace with a carbonaceous solid fuel, whereby the combustion in the fluidized bed furnace is performed with the oxygen-containing exhaust gases of the superimposed gas turbine process and electrical energy is generated with both turbine processes.

The exhaust gases of the superimposed gas turbine process is expended only to such an extent that the fluidized bed furnace may be operated as a pressurized fluidized bed. The flue gases of the pressurized fluidized bed furnace, after removal of dust, are expanded in a second gas turbine process and subsequently subjected to a heat exchange. The air for the superimposed gas turbine process is subjected to a two-stage compression with recooling between the compression stages with the aid of gas turbine processes, whereby the compression energy for the first stage is derived from the second gas turbine process and the compression energy for the second stage is derived from the superimposed gas turbine process.

Such a method is known from DE-A-32 24 577 in which the air subjected to the two-stage compression is heated via air heating surfaces that are arranged within the furnace chamber of the fluidized bed furnace. Thus, high-quality heat is transferred onto the compressed air which is subsequently released during the combustion of the solid fuel within the pressurized fluidized bed at approximately 850° C. The portion of the combustion heat which has been used for heating up the compressed air, is not accessible to the steam generation for the steam turbine process but is introduced into the low pressure gas turbine process which, due to its limited turbine introduction temperature, has only a medium efficiency.

A method is known from DE-OS 36 12 888 in which a gas is used as the combustible fluid which is produced from a solid carbonaceous material by pressure gasification in a circulating fluidized bed. The gas produced by pressure gasification is expanded to a very low pressure stage, for example, 1.35 bar and is then fed into a circulating atmospheric fluidized bed. The total efficiency that can be achieved with the known method is 42%.

A method for operating a combined gas turbine/steam turbine process is also known from DE-OS 35 36 451 in which the compression of the combustion and fluidizing air necessary for the operation of the pressurized fluidized bed is achieved in two stages, the first stage being performed in a compressor of a turbo charger, and the second stage being performed in a compressor driven by a gas turbine. Between the two stages the air is intermediately cooled, in order to reduce the amount of compression work. Before entering the furnace chamber of the pressurized fluidized bed furnace, the air is preheated in a air preheating unit, which is operated with the partially expanded flue gas of the pressurized fluidized bed furnace that has been expanded in the gas turbine. In the air preheating unit heat is transferred to the compressed air from the flue gas which is still under a higher pressure. The air preheating unit has connected thereto in a down-stream position a further feed water preheating unit in which heat is also transferred to the feed water. The remaining energy within the flue gas is sufficient to operate the turbo charger of the first compressing stage. With the known method a net efficiency of 38% may be achieved. The combustion temperature of 850° within the pressurized fluidized bed therefore sets a limit for the improvement of the efficiency as well as the specific work of the combined process with a pressurized fluidized bed.

It is therefore an object of the present invention to improve the efficiency of the known combined gas turbine/steam turbine process with a boosted superimposed gas turbine.

SUMMARY OF THE INVENTION

As a solution to this object it is inventively suggested that the exhaust gases of the superimposed gas turbine process are expanded only to an extent to which the fluidized bed furnace may be operated as a pressurized fluidized bed and that the flue gases of the pressurized fluidized bed furnace, after removal of dust, are expanded in a second gas turbine process and subsequently subjected to a heat exchange with the compressed air of the superimposed gas turbine process and that the air for the superimposed gas turbine process is subjected to a two-stage compression with recooling, whereby the compression energy for the first stage is derived from the second gas turbine process and the compressing energy for the second stage is derived from the superimposed gas turbine process.

In this manner, the limitation of the turbine introduction temperature of 850° C. in the combined process, which is dictated by the fluidized bed furnace, may be overcome due to the incorporation of the boosted superimposed gas turbine into the process. With this method, in which the compressed air for the superimposed gas turbine process is preheated by heat exchange with the flue gas of the second gas turbine process, no high quality heat is removed from the steam turbine process but heat from the low pressure gas turbine process is introduced into the high pressure superimposed gas turbine process. Thus, an efficiency of more than 50% may be achieved. Furthermore, a reduction of the $CO_2$ emission is achieved which usually may only be accomplished with natural gas power plants. The method furthermore is very flexible with respect to fuel to be used so that natural gas and oil may be employed as combustible fluids within installations assembled on a short-term basis. With advancing developments the superimposed gas turbine may also be fueled with coal gas produced by gasification of coal, hydrogen, or methanol/ethanol. The inventive method results in power plants of a high efficiency density which are especially distinguished by good partial load characteristics.

When the combustible fluid to be used is a gas that is produced by pressure gasification of a solid carbonaceous material, especially coal gas, a further advantage is that the gasification may be carried out in a fluidized bed, especially a high expanded fluidized bed with trapping chute separators.

To improve the partial load characteristics it is expedient to feed partially compressed air of the first compressing step into the fluidized bed furnace in addition to the exhaust gases of the superimposed gas turbine.

Further dependent claims relate to preferable embodiments of the inventive method and an apparatus for performing the method.

BRIEF DESCRIPTION OF THE DRAWINGS

The invention will now be explained with the aid of the enclosed figures. It is shown in.

Figure 1:
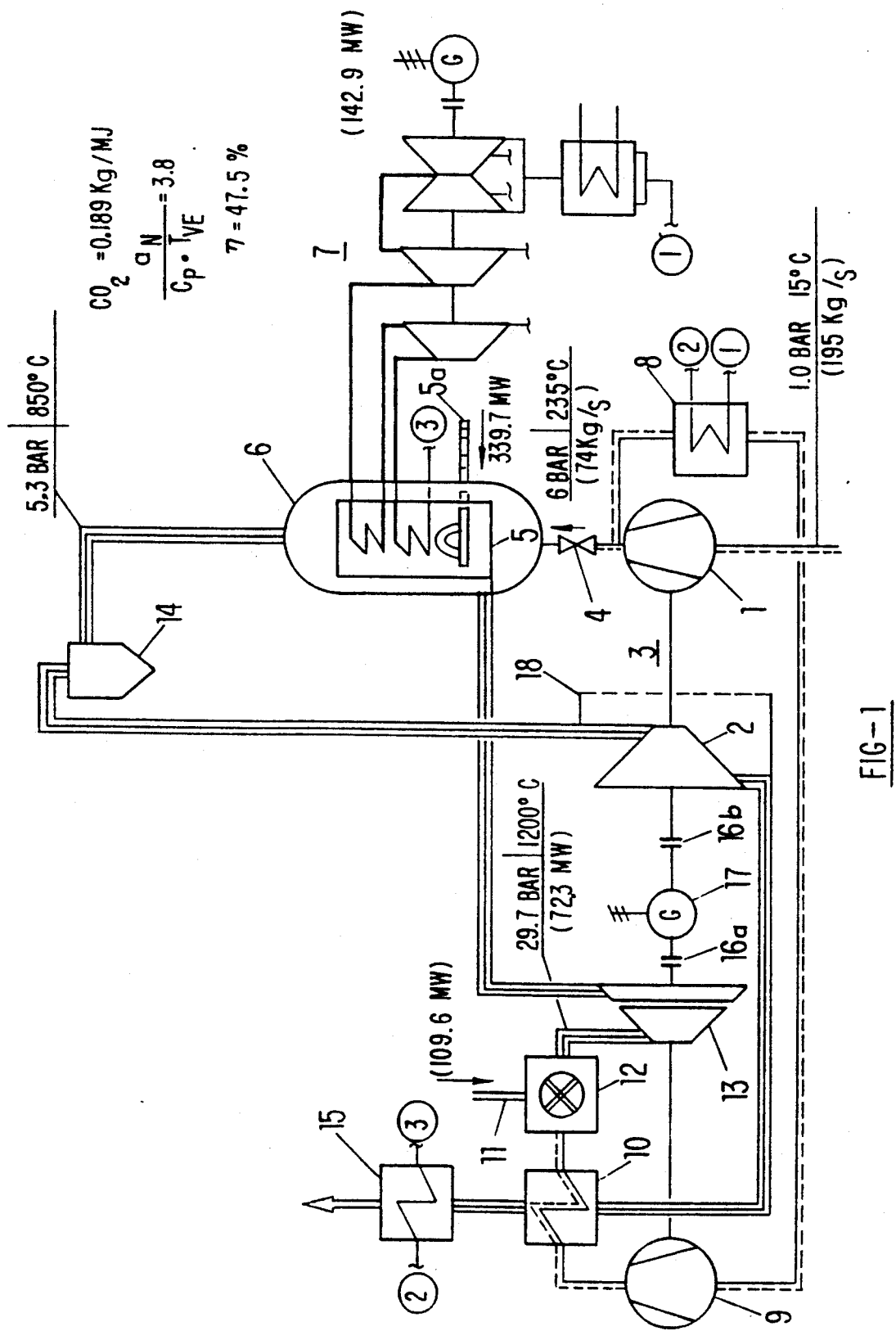
FIG. 1 a pressurized fluidized bed furnace with a superimposed boosted gas turbine, flue gas turbine and steam turbine arrangement whereby the superimposed gas turbine is operated with natural gas.

In the arrangement according to FIG. 1 the combustion air is compressed in a first stage in a compressor 1 which, together with a low pressure turbine 2 constitutes a gas turbo unit 3. Via a valve 4 a partial flow of the compressed air is fed into the furnace chamber 5 of a schematically represented pressurized fluidized bed furnace 6. Another partial flow is recooled by a cooling unit 8 which is disposed in the feed water circulation of a steam turbine unit 7 which is arranged downstream of the pressurized fluidized bed furnace 6 and this partial flow is then further compressed in a high pressure compressor 9. The compressed air is preheated in a preheating unit 10 and is guided into a combustion chamber 12 of a superimposed gas turbine 13 which is fueled by natural gas 11. The combustion or exhaust gas is expanded within the gas turbine to a pressure that corresponds to a pressure that is suitable for the operation of the pressurized fluidized bed furnace and corresponds to the pressure of the partial air stream that is introduced via the valve 4, and is then introduced into the furnace chamber 5 of the pressurized fluidized bed furnace 6.

The flue gas of the pressurized fluidized bed furnace 6 is filtered with a hot gas filter 14 and is then introduced into the low pressure turbine 2. The flue gas cools during expansion according to the respective pressure ratio. Its detectable heat is used in the air preheating unit 10 for the compressed air and in the cooling unit 8 which is arranged downstream of the feed water preheating unit 15. In FIG. 1, for example, the absolute mass flows and efficiencies are indicated. The not yet optimized process has an efficiency rating of 47.5%, a specific output of 3.8, and a $CO_2$ emission of 0.189 kG/MJ at a natural gas ratio of 24.3% of the total fuel efficiency. When the valve 4 is closed, i.e., only the combustion gas of the gas turbine fueled by natural gas is introduced into the pressurized fluidized bed furnace 6 as an oxygen carrier, the efficiency increases to over 51%, the specific output to 5.48 and the $CO_2$ emission is lowered to 0.17 kG/MJ at a natural gas ratio of 39.7% of the total fuel efficiency. In FIG. 1 it is furthermore shown that the gas turbo unit 3 and the boosted superimposed gas turbine 13 are coupled via clutches 16a respectively 16b to a generator 17. It is advantageous that the clutch 16b be disengaged so that the gas turbo unit 3 idles when the gas turbo unit 3 is started up or runs at extremely low loads and too low introduction temperatures.

The apparatus according to FIG. 1 demonstrates the favorable option for regulating partial loads by reducing the amount of air of the fluidized bed furnace via valve 4 during constant operation conditions of the superimposed gas turbine 13. During the start-up of the apparatus a bypass line 18 is first opened which is associated with the turbine 2 and then the gas turbine 13 is started. The gas turbine exhaust gas is hot enough to heat the fluidized bed to the required ignition temperature of the coal that is introduced via 5a.

Figure 2:
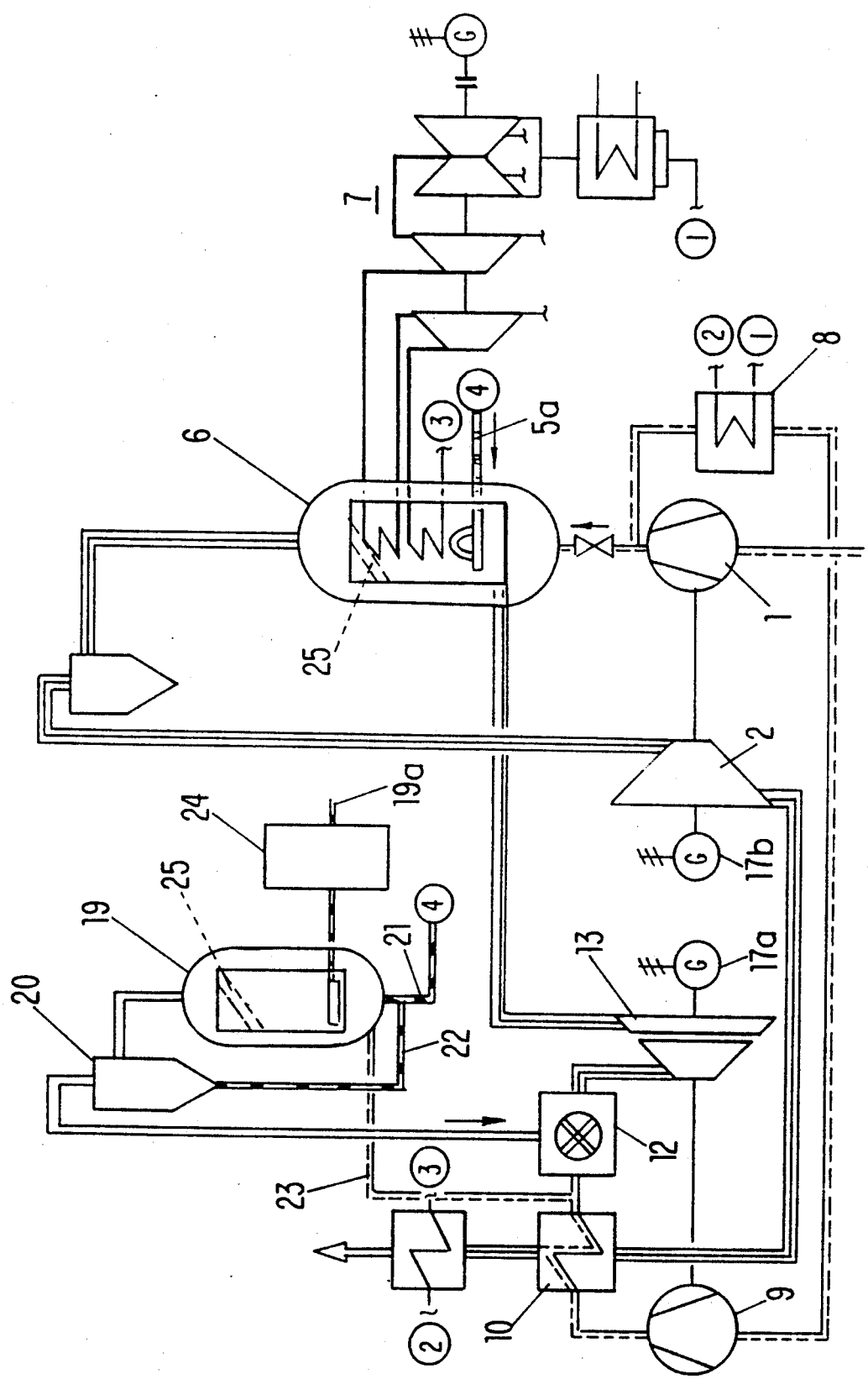
FIG. 2 a diagram corresponding to FIG. 1 in which, however, the superimposed gas turbine is operated with coal gas that is produced by pressurized partial gasification.

In FIG. 2 comparable components of the apparatus are referred to by identical reference numerals. Into the combustion chamber 12 coal gas is introduced as the combustible fluid which is produced by a fluidized bed partial gasification 19 after removal of dust and, optionally, desulfurization and dehalogenation. Only the dust removal 20 is schematically represented. The coke that is produced by the partial gasification 19 and the removed dust 22 is introduced via line 21 into the pressurized fluidized bed furnace 6 together with the coal 5a.

A partial flow of compressed air is introduced into the fluidized bed partial gasification 19 via a line 23.

The coal 19a that is introduced into the partial pressure gasification 19 may be pre-dried in a known fluidized bed steam dryer 24. Furthermore, it is indicated in FIG. 2 that the fluidized bed 19 for the partial gasification and the fluidized bed furnace 6 may be embodied as expanded fluidized beds having trapping chute separators arranged within the interior of the furnace chamber, as is known from DE-OS 36 40 377.6.

During the partial pressure gasification no water or steam cooling takes place for the achievable reaction temperature of 850° C. The output of the turbine 13 is primarily used for the compressor for compressing the combustion gases and the gasification air. The excess output is introduced into the electric-power supply network via the generator 17.

The embodiment represented in FIG. 2 shows the compressor turbine groups ½ and 9/13 separately arranged and associated with a respective generator 17a respectively 17b.

In the following table examples of the operational conditions of an apparatus according to claim 1 are given. The range for preferred operational conditions are also given.

The present invention is, of course, in no way restricted to the specific disclosure of the specification and drawings, but also encompasses any modifications within the scope of the appended claims.

Example According to FIG. 1 and Preferred Examples

|  | Figure | Range |
| --- | --- | --- |
| introduction pressure for superimposed gas turbine 13 | 29.7 bar | 25–35 bar |
| introduction temperature | 1200° C. | according to known values in gas turbine technology |
| gas pressure in furnace chamber 5 | 6 bar | 4–12 bar |
| air introduction temperature for furnace chamber 5 | 235° C. | 180–385° C. |
| turbine gas introduction temperature for furnace chamber 5 | 780° C. | 600–850° C. |
| flue gas pressure | 5.3 bar | 3.5–10 bar |

What we claim is:

1. A method for operating a combination of a superimposed boosted gas turbine process and a steam turbine process for generating electrical energy, comprising the steps of:

operating said superimposed boosted gas turbine process with compressed air and combustible fluid;

operating said steam turbine process with a fluidized bed furnace with a carbonaceous solid fuel;

performing combustion in said fluidized bed furnace with oxygen-containing exhaust gases from said superimposed boosted gas turbine process;

expanding said oxygen-containing exhaust gases to such an extent that said fluidized bed furnace is operable as a pressurized fluidized bed;

removing solid particles from flue gases of said fluidized bed furnace;

expanding said flue gases in a second gas turbine process;

in a first step, compressing air for said superimposed boosted gas turbine process with recooling, and in a second step, repeating compressing, whereby compressing energy for said first step is derived from said second gas turbine process and compressing energy for said second step is derived from said superimposed boosted gas turbine process; and performing a heat-exchange of said flue gases with said compressed air of said superimposed boosted gas turbine process.

2. A method according to claim 1, further comprising the step of:

in addition to said oxygen-containing exhaust gases, feeding partially compressed air of said first step into said fluidized bed furnace.

3. A method according to claim 1, further comprising the step of performing a second heat-exchange of said flue gases with feed water for said steam turbine process.

4. A method according to claim 1 wherein said combustible fluid is natural gas.

5. A method according to claim 1, wherein said combustible fluid is a gas, that is generated from a solid carbonaceous material by a pressurized gasification process, with carbonaceous residual particles being combusted in said pressurized fluidized bed furnace.

6. A method according to claim 5, wherein said carbon containing residual particles are combusted in the presence of additional fuel.

7. A method according to claim 5, wherein said solid carbonaceous material is dried in a fluidized bed steam dryer.

8. A method according to claim 1, wherein during start-up of said second gas turbine process at a low introduction temperature a corresponding gas turbo unit is idling.

9. An apparatus for operating a combination of a superimposed boosted gas turbine process and a steam turbine process for generating electrical energy, said apparatus comprising:

a pressurized fluidized bed furnace that is operated with carbonaceous solid fuel;

a superimposed boosted gas turbine connected to said fluidized bed furnace at an up-stream position;

a second gas turbine connected to said pressurized fluidized bed furnace at a down-stream position;

a steam turbine connected to said fluidized bed furnace;

electrical generators associated with said superimposed boosted gas turbine, said second gas turbine and said steam turbine, respectively;

a hot gas filter disposed between said pressurized fluidized bed furnace and said second gas turbine;

a first compressor drivingly connected to said second gas turbine;

a second compressor drivingly connected to said superimposed boosted gas turbine;

an air preheating unit connected via inlets thereof to said first and said second compressors and connected with an outlet thereof to said superimposed boosted gas turbine; and a cooling unit disposed between said first and said second compressors.

10. An apparatus according to claim 9, wherein said superimposed boosted gas turbine and said second gas turbine are connected to one of said electrical generators.

11. An apparatus according to claim 10, further comprising:

a first clutch disposed between said one electrical generator and said superimposed boosted gas turbine; and a second clutch disposed between said one electrical generator and said second gas turbine.

12. An apparatus according to claim 9, wherein said superimposed boosted gas turbine is connected to a first one of said electrical generators and said second gas turbine is connected to a second one of said electrical generators.

* * * * *